US012707345B2

(12) United States Patent
Takeda et al.

(10) Patent No.: US 12,707,345 B2
(45) Date of Patent: Aug. 11, 2026

(54) TERMINAL APPARATUS THAT EFFICIENTLY CHANGES CONNECTION-TARGET CELLS, AND CONTROL METHOD

(71) Applicant: KDDI CORPORATION, Tokyo (JP)

(72) Inventors: Hiroki Takeda, Tokyo (JP); Yanwei Li, Tokyo (JP); Yoshitaka Takaku, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/950,581

(22) Filed: Nov. 18, 2024

(65) Prior Publication Data

US 2025/0081051 A1 Mar. 6, 2025

Related U.S. Application Data

(63) Continuation of application No. PCT/JP2023/031803, filed on Aug. 31, 2023.

(30) Foreign Application Priority Data

Sep. 27, 2022 (JP) ................................ 2022-153890

(51) Int. Cl.
*H04W 36/00* (2009.01)
*H04W 36/04* (2009.01)
*H04W 36/36* (2009.01)

(52) U.S. Cl.
CPC ....... *H04W 36/0069* (2018.08); *H04W 36/04* (2013.01); *H04W 36/362* (2023.05)

(58) Field of Classification Search
CPC . H04W 36/0069; H04W 36/04; H04W 36/18; H04W 36/30; H04W 36/362; H04W 76/15; H04W 76/28; H04B 7/06964; H04L 5/001; H04L 5/0098
USPC .......................................................... 370/331
See application file for complete search history.

(56) References Cited

U.S. PATENT DOCUMENTS 11,528,765 B2 12/2022 Kim et al.
12,004,248 B2 6/2024 Kim et al.
2014/0323096 A1 10/2014 Bai et al.
2015/0009872 A1* 1/2015 Yang ........................ H04J 3/00 370/280
2017/0013673 A1 1/2017 Uchino et al.
2017/0150387 A1 5/2017 Fujishiro et al.
(Continued)

FOREIGN PATENT DOCUMENTS

JP 2012-039467 A 2/2012
JP 2015-154462 A 8/2015
(Continued)

OTHER PUBLICATIONS

Decision to Grant a Patent issued in corresponding Japanese Patent Application No. 2022-153890 on Jan. 6, 2025, with English Translation (4 pages).

(Continued)

*Primary Examiner* — Jean A Gelin
(74) *Attorney, Agent, or Firm* — Foley & Lardner LLP

(57) ABSTRACT

A base station sets, to a terminal apparatus, in advance control parameters used when performing communication
(Continued)

using, as a primary cell, a cell used as a secondary cell, thereby omitting, when changing the cell from the secondary cell to the primary cell, setting of necessary parameters.

9 Claims, 3 Drawing Sheets

(56) References Cited

U.S. PATENT DOCUMENTS

| | | | | |
|---|---|---|---|---|
| 2017/0310434 | A1 | 10/2017 | Harada et al. | |
| 2019/0274077 | A1 | 9/2019 | Suzuki et al. | |
| 2019/0342417 | A1* | 11/2019 | Gerdfeldter | H04L 69/16 |
| 2021/0014104 | A1* | 1/2021 | Chen | H04L 41/0654 |
| 2021/0058998 | A1* | 2/2021 | Yuan | H04W 24/08 |
| 2021/0168631 | A1 | 6/2021 | Chen et al. | |
| 2021/0250833 | A1* | 8/2021 | Ioffe | H04W 36/14 |
| 2021/0297909 | A1 | 9/2021 | Lee et al. | |
| 2022/0123820 | A1* | 4/2022 | Jiang | H04W 74/0833 |
| 2022/0140884 | A1* | 5/2022 | Shi | H04W 24/10 370/329 |
| 2022/0150731 | A1* | 5/2022 | Li | H04B 7/06964 |
| 2022/0408336 | A1* | 12/2022 | Huang | H04B 7/06964 |
| 2023/0199752 | A1* | 6/2023 | Shi | H04L 5/0044 |
| 2023/0308962 | A1* | 9/2023 | Kung | H04W 36/0064 |
| 2024/0080696 | A1* | 3/2024 | Agiwal | H04W 24/10 |
| 2024/0107428 | A1* | 3/2024 | Hoshino | H04L 5/001 |
| 2024/0147328 | A1* | 5/2024 | Kim | H04W 36/30 |
| 2025/0097929 | A1* | 3/2025 | Lee | H04L 5/001 |
| 2025/0233653 | A1* | 7/2025 | Shimoda | H04B 7/208 |
| 2025/0297717 | A1* | 9/2025 | Linden | B60Q 1/045 |
| 2026/0012860 | A1* | 1/2026 | Wang | H04W 36/0058 |

FOREIGN PATENT DOCUMENTS

| | | | |
|---|---|---|---|
| JP | 2020-074623 | A | 5/2020 |
| JP | 2020-524937 | A | 8/2020 |
| JP | 2021-533676 | A | 12/2021 |
| JP | 2023-501369 | A | 1/2023 |
| WO | WO-2016/072220 | A1 | 5/2016 |
| WO | WO-2018/092882 | A1 | 5/2018 |
| WO | WO-2021/210576 | A1 | 10/2021 |

OTHER PUBLICATIONS

European Search Report for related Appl. Ser. No. EP 23 87 1712 dated Sep. 16, 2025 (12 pages).

Intel Corp., Discussion Summary #2 for energy saving techniques of NW energy saving SI; R1-2208185, 3GPP TSG RAN WG1 Meeting #110, Toulouse, France, Aug. 22-26, 2022 (pp. 1-122).

Qualcom Inc., 3GPP TSG RAN WG1 #110, Network energy saving techniques; R1-2207246, Toulouse, France, Aug. 22-Aug. 26, 2022 (pp. 1-25).

* cited by examiner

F I G. 1
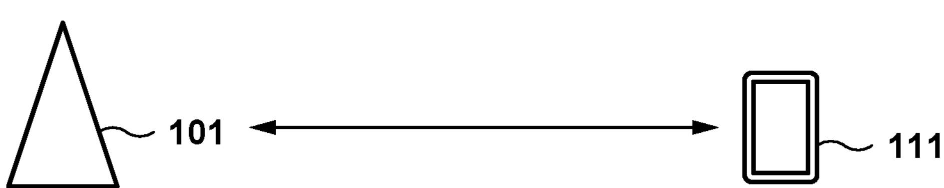
F I G. 2
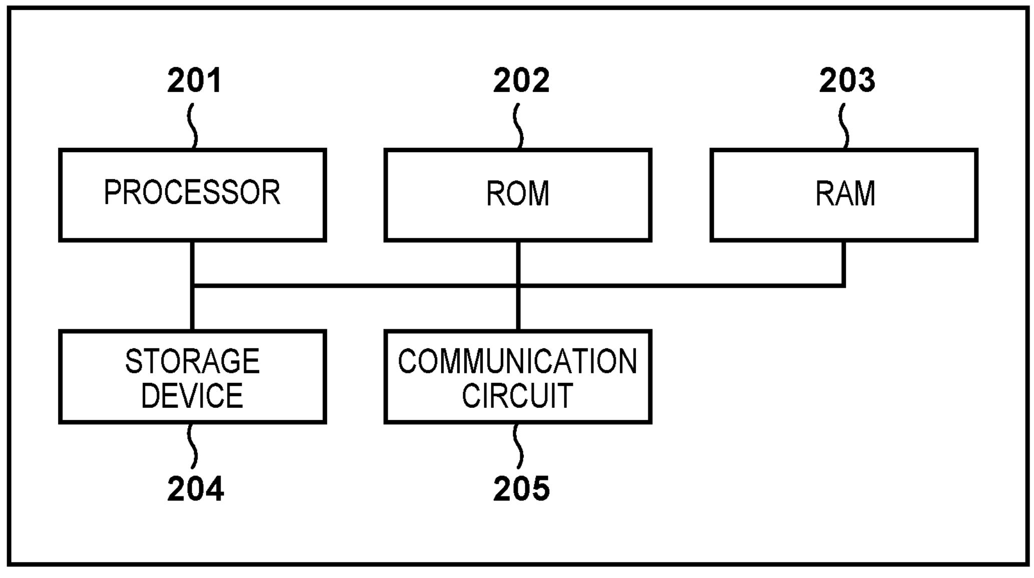

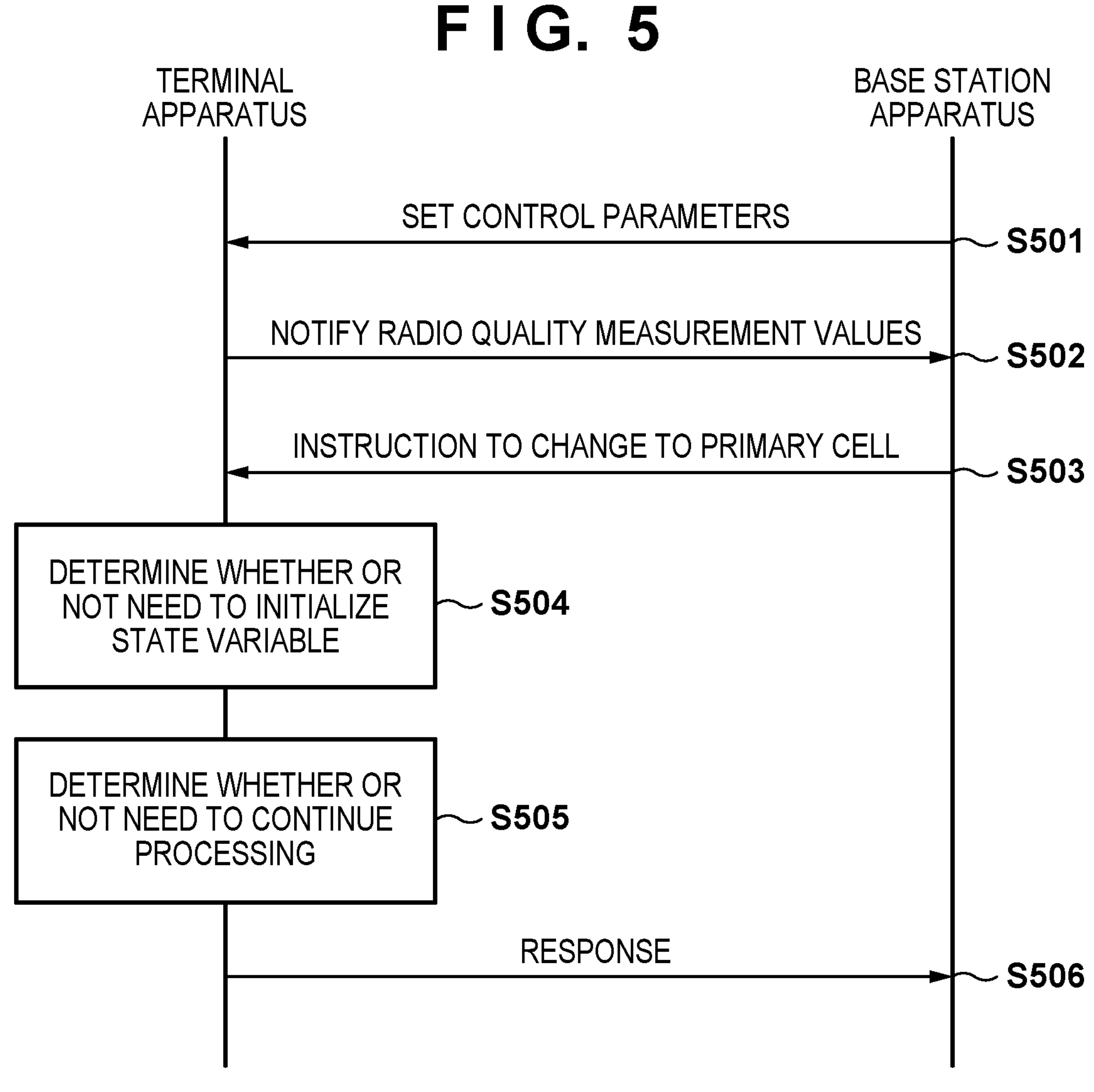
F I G. 5
TERMINAL APPARATUS
BASE STATION APPARATUS
SET CONTROL PARAMETERS
S501
NOTIFY RADIO QUALITY MEASUREMENT VALUES
S502
INSTRUCTION TO CHANGE TO PRIMARY CELL
S503
DETERMINE WHETHER OR NOT NEED TO INITIALIZE STATE VARIABLE
S504
DETERMINE WHETHER OR NOT NEED TO CONTINUE PROCESSING
S505
RESPONSE
S506

TERMINAL APPARATUS THAT EFFICIENTLY CHANGES CONNECTION-TARGET CELLS, AND CONTROL METHOD

CROSS-REFERENCE TO RELATED APPLICATION(S)

This application is a continuation of International Patent Application No. PCT/JP2023/031803 filed on Aug. 31, 2023, which claims priority to and the benefit of Japanese Patent Application No. 2022-153890 filed Sep. 27, 2022, the entire disclosures of which are incorporated herein by reference.

BACKGROUND OF THE INVENTION

Field of the Invention

The present invention relates to a technique for changing connection-target cells in a cellular communication system.

Description of the Related Art

In cellular communication standards of 3GPP (third generation partnership project (registered trademark)), DC (dual connectivity) and CA (carrier aggregation) are specified to enable a terminal apparatus to use a plurality of CCs (component carriers) at the same time.

In DC and CA, it is envisioned that a cell to which a terminal apparatus is connected is dynamically switched. In particular, when the communication environment changes frequently and significantly due to frequency bands used for communication shifting to higher frequency bands, it is envisioned that such a switch between connection-target cells frequently occurs. For this reason, it is important for a switch between connection-target cells to be performed at a high speed.

The present invention provides a technique for enabling a terminal apparatus that is connected to a plurality of cells in parallel to perform a switch between connection-target cells at a high speed.

SUMMARY OF THE INVENTION

A terminal apparatus according to one aspect of the present invention is a terminal apparatus that communicates with a base station apparatus using a primary cell and a secondary cell through carrier aggregation, the terminal apparatus comprising: a first receiving unit configured to receive parameters required when one or more cells are used as primary cells, respectively, and parameters required when the one or more cells are used as secondary cells, respectively; a changing unit configured to change a first cell among the one or more cells to a primary cell in a case where the first cell is being used as a secondary cell; and a second receiving unit configured to receive, from the base station apparatus, information regarding whether or not to continue to use, as a secondary cell, a second cell that will be no longer a primary cell after the first cell is changed to a primary cell.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram showing a configuration example of a wireless communication network.

FIG. 2 is a diagram showing an exemplary hardware configuration of an apparatus.

FIG. 5 is a diagram showing an example of flow of processing that is executed in the wireless communication network.

DESCRIPTION OF THE EMBODIMENTS

Figure 3:
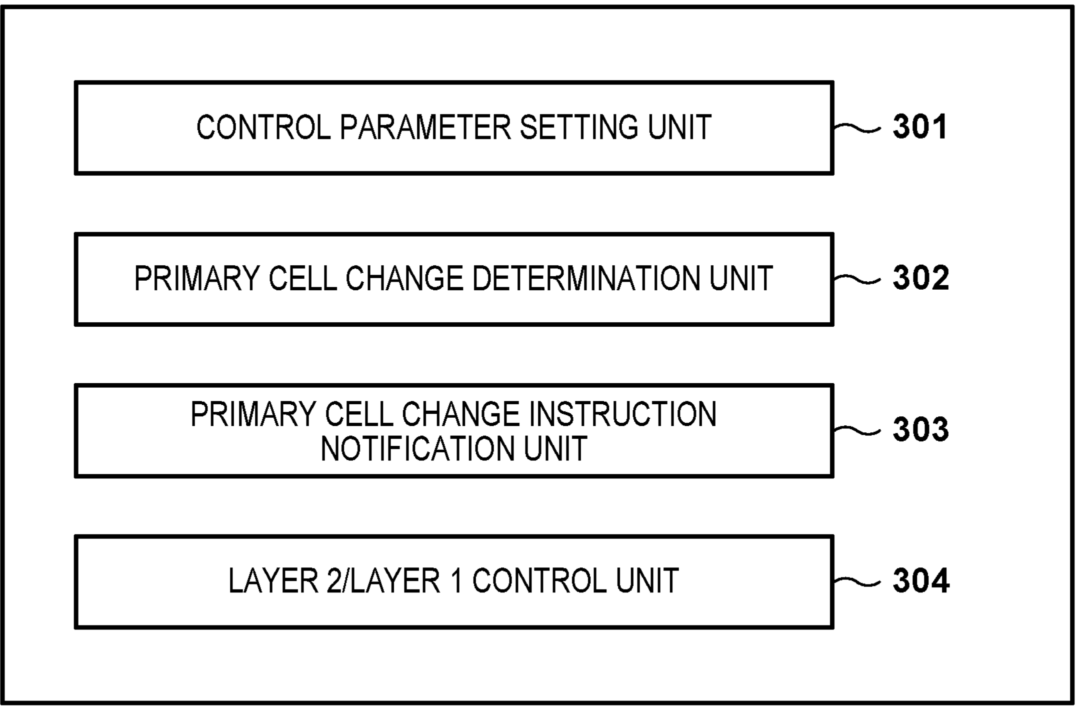
FIG. 3 is a diagram showing an exemplary functional configuration of a base station apparatus.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 shows a configuration example of a wireless communication system according to the present embodiment. The wireless communication system complies with the LTE (long term evolution) or 5G (fifth generation) cellular communication standard, or a cellular communication standard after them, for example, and is configured by including a base station apparatus 101 and a terminal apparatus 111. Note that, here, for ease of description, a small number of base station apparatuses and terminal apparatus are illustrated, but, as a matter of course, there can be a large number of base station apparatuses and terminal apparatuses.

In the present embodiment, the terminal apparatus 111 is configured to be able to perform communication with the base station apparatus 101 in parallel using a plurality of CCs (component carriers) at the same time through DC (dual connectivity) or CA (carrier aggregation). Note that FIG. 1 shows an example where the terminal apparatus 111 is connected to one base station apparatus 101, but the terminal apparatus 111 may also be connected to a plurality of base station apparatuses in parallel. In addition, “CC” in the following description can be replaced by “cell”. A plurality of CCs may be configured in the same frequency band, but, in the present embodiment, communication that uses a plurality of CCs respectively corresponding to a plurality of frequency bands is performed. In the present embodiment, the terminal apparatus 111 is configured to be able to use only some combinations of a plurality of different frequency bands, not all combinations of the plurality of frequency bands. The terminal apparatus 111 can use a combination of a first frequency band and a second frequency band and a combination of the first frequency band and a third frequency band, but cannot use a combination of the second frequency band and the third frequency band and a combination of the first frequency band, the second frequency band, and the third frequency band, for example. Note that the first frequency band, the second frequency band, and the third frequency band can be respectively a band 1, a band 18, and a band 41 that are stipulated in the standard, for example. In addition, although three frequency bands will be described here, an additional frequency band such as a fourth frequency band (for example, a band 42) may be prepared.

In the present embodiment, for example, the base station apparatus 101 performs communication with a terminal apparatus through CA (carrier aggregation) in which a CC (component carrier) in the first frequency band is designated as a primary cell and a CC (component carrier) in the second frequency band is designated as a secondary cell. Note that both the primary cell and the secondary cell may be configured as LTE cells, or both the primary cell and the secondary cell may be configured as 5G cells. That is to say, both the primary cell and the secondary cell may be configured as cells in the same wireless system. In addition, a configuration may be adopted in which the primary cell is configured as an LTE cell and the secondary cell is configured as a 5G cell, or a configuration may also be adopted in which the primary cell is configured as a 5G cell and the secondary cell is configured as a cell specified based on the LTE or subsequent next-generation standard. That is to say, the primary cell and the secondary cell may also be configured as cells of different wireless systems.

In the present embodiment, a case is considered in which the primary cell and the secondary cell are switched. For such a switch, there is a need to give two instructions for a handover for changing the primary cell that is currently being used to a new primary cell and a change of the secondary cell that is currently being used to a new secondary cell. These instructions are given using RRC (radio resource control) signaling of a layer 3. That is to say, the base station apparatus 101 instructs, using an RRC message, the terminal apparatus 111 to change the CC (component carrier) in the second frequency band to a primary cell, and the CC (component carrier) in the first frequency band to a secondary cell, for example. At this time, normally, upon receiving a change instruction from the base station apparatus 101, the terminal apparatus 111 initializes state variables used for controlling a layer 2 and a layer 1 for each of the primary cell and the secondary cell. The terminal apparatus 111 then resets control parameters of the layer 2 and the layer 1 based on the cells after the change. In addition, at this time, if control processing of at least one of the layer 2 and the layer 1 is being executed, the terminal apparatus 111 stops this processing.

Commonly, examples of the state variables, which are used for controlling the layer 2 and the layer 1 and are initialized, include a counter BFI_COUNTER used for beam failure detection, SR_COUNTER used for controlling a scheduling request, and NTA that is used for timing advance control that realizes uplink transmission timing correction.

In a case where beamforming is applied, state variables used for controlling the layer 2 and the layer 1 can include a state variable related to beam control. The base station apparatus 101 and the terminal apparatus 111 control a transmission beam (Tx beam) and a receiving beam (Rx beam) of each signal/channel using TCI (transmission configuration indication) settings. The base station apparatus 101 determines a transmission beam that is used for downlink transmission on a PDSCH (physical downlink shared channel), based on a measurement result of a reference signal notified by the terminal apparatus 111, for example. Then, before data transmission that uses the PDSCH, the base station apparatus 101 gives an instruction on TCI settings for the terminal apparatus 111 to receive a signal transmitted using the determined transmission beam, to the terminal apparatus 111, using DCI (downlink control information) included in a PDCCH (physical downlink control channel). In addition, the base station apparatus 101 determines a transmission beam that is used for uplink transmission on a PUSCH (physical uplink shared channel), based on a measurement result of a reference signal transmitted by the terminal apparatus 111. Then, when scheduling the PUSCH, the base station apparatus 101 gives an instruction on TCI settings for the terminal apparatus 111 to transmit a signal using the determined transmission beam, using DCI (downlink control information) included in the PDCCH (physical downlink control channel). Note that, for example, in this beam control, the base station apparatus 101 can notify the terminal apparatus 111 of TCI settings that can be used by the terminal apparatus 111, using layer 3 signaling, then activate some of the TCI settings, and select an appropriate TCI setting from the activated TCI settings. The base station apparatus 101 instructs the terminal apparatus 111 to activate or deactivate each TCI setting, using MAC CE (media access control/control element). The base station apparatus 101 can then notify the terminal apparatus 111 of a TCI setting corresponding to a beam to be used, from among the activated TCI settings, using the above DCI. In addition, as another method for beam control, there is also a technique that uses an SRS resource indicator. With this technique, the base station apparatus 101 determines an SRS-RI (SRS resource indicator) based on a sounding reference signal transmitted by the terminal apparatus 111, and notifies the terminal apparatus 111 of the determined SRS-RI. The terminal apparatus 111 can determine a precoder that is used for a transmission beam, based on information such as an SRS resource indicator designated by the base station apparatus 101, a codebook, and the number of antenna ports. The terminal apparatus 111 generates a transmission beam that is used for uplink transmission on the PUSCH (physical uplink shared channel), using the determined precoder. In a case where the primary cell or the secondary cell is changed, information regarding activation/deactivation of the TCI settings, information regarding the TCI settings used for transmitting and receiving beams on channels such as the PDSCH and the PUSCH, information regarding SRS-RI settings, which were set before the change, are initialized upon the change.

In addition, also when CA (carrier aggregation) is executed, HARQ (hybrid automatic repeat request) control is performed in the layer 2 and the layer 1 in the same manner as communication that uses a single carrier. As an example, the terminal apparatus 111 notifies, using the PUCCH, the base station apparatus 101 of HARQ-ACK/NACK indicating whether or not PDSCH data was successfully decoded. At this time, in a case where an instruction to change the primary cell is given after the PDSCH data is received by the primary cell and before the HARQ-ACK/NACK is transmitted, the terminal apparatus 111 can suspend scheduled transmission of the HARQ-ACK/NACK. In addition, similarly to the above case of the primary cell, also when the secondary cell is changed in a case where an instruction to change the secondary cell is given after the PDSCH data is received by the secondary cell and before the HARQ-ACK/NACK is transmitted, the terminal apparatus 111 can suspend scheduled transmission of the HARQ-ACK/NACK. In addition, in HARQ control, if decoding of the received data fails (decoded data includes an error), the terminal apparatus 111 holds the data in a memory area called a "soft buffer" in order to correct the error later. The terminal apparatus 111 then combines data newly retransmitted from the base station apparatus 101 and the held data, and decodes the combined data. Accordingly, it is possible to execute highly error-resistant communication. In general, when an instruction to change the primary cell or the secondary cell is given, the terminal apparatus 111 erases the data held in the soft buffer in order to correct the error.

In addition, control of the layer 2 and the layer 1 can include CDRX (connected discontinuous reception) control. As an example, when the primary cell is changed to a secondary cell, the terminal apparatus 111 stops timers related to CDRX control such as an onDurationTimer (a timer for controlling a period during which a DRX-ON state is maintained), a drx-inactivityTimer (DRX inactivity timer that is started to maintain a DRX-ON state for a certain period of time after PDCCH is received), a drx-ShortCycleTimer (timer for designating a duration of a short DRX cycle), drx-HARQ-RTT-TimerDL (minimum duration until downlink resource allocation for HARQ retransmission), and drx-HARQ-RTT-TimerUL (minimum duration until downlink resource allocation for HARQ retransmission.

In addition, control of the layer 2 and the layer 1 can include PHR (power headroom report) control. As an example, when the primary cell is changed to a secondary cell, the terminal apparatus 111 stops timers related to PHR control such as a phr-Periodic Timer (a timer for controlling a PHR reporting period) and a phr-ProhibitTimer (timer for controlling a PHR reporting prohibition period).

On the other hand, when a cell that has been used as a primary cell is changed to a secondary cell, in both the terminal apparatus 111 and the base station apparatus 101, a MAC entity and a PHY (physical) layer for controlling the layer 2 and the layer 1 for the primary cell can continue to be used to control the secondary cell after the change. For this reason, it can be said that, when control parameters for the layer 2 and the layer 1 are changed, there is a need to initialize state variables that have been used to control the layer 2 and the layer 1 before the primary cell is changed to the secondary cell, but, when the control parameters are not changed, there is no need to initialize the state variables. In addition, also in a case where a cell that has been used as a secondary cell is changed to a primary cell, similarly, the MAC entity and PHY layer for controlling the layer 2 and the layer 1 for the secondary cell can continue to be used to control the primary cell after the change. For this reason, also in this case, it can be said that, when the control parameters for the layer 2 and the layer 1 are not changed, there is no need to initialize the state variables that have been used for controlling the layer 2 and the layer 1.

In the present embodiment, in light of the aforementioned circumstances, when the terminal apparatus 111 switches between the primary cell and the secondary cell, it is possible to maintain the state variables for controlling the layer 2 and the layer 1 without initializing the state variables as necessary. As an example, upon receiving, from the base station apparatus 101, an instruction to change a cell that is being used as a primary cell to a secondary cell, the terminal apparatus 111 determines whether or not to change a control parameter for at least one of the layer 2 and the layer 1. If it is determined that the control parameter is to be changed, the terminal apparatus 111 initializes the state variables that have been used for controlling the layer 2 and the layer 1 as with conventional cases. On the other hand, if it is determined that the control parameter is not to be changed, the terminal apparatus 111 does not initialize the state variables that have been used for controlling the layer 2 and the layer 1. In addition, if it is determined that the control parameter is to be changed, the terminal apparatus 111 ends processing that had been started before the cell change instruction was received, and has not been completed yet, as with conventional cases. On the other hand, if it is determined that the control parameter is not to be changed, the terminal apparatus 111 continues processing that had been started before the cell change instruction was received. In addition, also when an instruction to change a cell that is being used as a secondary cell to a primary cell is received, the terminal apparatus 111 can perform similar processing. That is to say, the terminal apparatus 111 determines whether or not to change a control parameter of at least one of the layer 2 and the layer 1, determines whether or not to initialize the state variables that have been used for controlling the layer 2 and the layer 1, and determines whether or not to continue processing that had been started before the cell change instruction was received. Note that processing such as determination on whether or not a control parameter is to be changed may be performed only for some of the above control items. A configuration may also be adopted in which, for example, the terminal apparatus 111 determines, only for HARQ, whether or not a control parameter is to be changed, whether or not to initialize state variables, and whether or not to continue processing, and does not perform such determination and the like for beamforming, PHR, and the like. In addition, the terminal apparatus 111 can separately perform determination on each control item for which determination is performed on whether or not a control parameter has been changed, and the like, and individually determine, based on the separately performed determination, whether or not to initialize the state variable and whether or not to continue processing. In addition, when the control parameter is not to be changed, the terminal apparatus 111 may notify the base station apparatus 101 of UE Capability (capability information) indicating whether or not it is possible to initialize the state variables and continue processing. In this case, the base station apparatus 101 can instruct the terminal apparatus 111 to or not to initialize the state variable and continue processing in accordance with the capability information notified by the terminal apparatus 111. Note that the capability information, in which appropriate information is set for each control item, can be notified to the base station apparatus 101.

Upon receiving an instruction to change the secondary cell or the primary cell, the terminal apparatus 111 maintains state variables related to beam failure detection and beam recovery without initializing them if it is determined that parameters related to beam failure detection and beam recovery have not been changed. In addition, the terminal apparatus 111 can continue processing related to beams that had been started before the cell change instruction was received. In a case where beam failure detection had been detected and a beamFailureDetectionTimer had been started before a cell change instruction was received, for example, upon receiving the change instruction, the terminal apparatus 111 holds a beam failure detection counter BFI_COUNTER without initializing it, and continues the beamFailureDetectionTimer without stopping it. In addition, in a case where beam recovery processing had been started before a cell change instruction was received, upon receiving the change instruction, the terminal apparatus 111 continues the processing without stopping it. In a case where a cell change instruction is received after RACH preamble was transmitted for beam recovery, for example, the terminal apparatus 111 continues a timer ra-ResponseWindow for controlling a monitoring period of an RA response from the base station apparatus 101 without stopping the timer. In addition, in a case where a cell change instruction is received after MAC CE (msg3) has been transmitted for beam recovery, the terminal apparatus 111 continues a ra-ContentionResolutionTimer (contention resolution timer) without stopping it. Accordingly, the terminal apparatus 111 can avoid a situation where beam failure detection or beam recovery is suspended upon a change of the secondary cell or the primary cell, and more efficiently perform beam control. In addition, similarly to beam failure and recovery, it is also possible to increase the efficiency of processing for a scheduling request. That is to say, in a case where a scheduling request was transmitted before a cell change instruction is received, upon receiving the change instruction, the terminal apparatus 111 holds a counterSR-_COUNTER of the scheduling request without initializing it, and continues a sr-ProhibitTimer (scheduling request prohibit timer) that is running, without stopping it. Accordingly, scheduling request prohibit processing is continued without being suspended by the instruction to change the secondary cell or the primary cell, and the efficiency of processing can be increased. In addition, if it is determined that a parameter that is used for timing advance control that realizes correction of an uplink transmission timing has not been changed, the terminal apparatus 111 holds a timing value NTA without initializing it. In addition, the terminal apparatus 111 may maintain a TAT (time alignment timer) that had been started before a cell change instruction was received, without stopping it, until the timer expires. Accordingly, upon receiving an instruction to change the secondary cell to a primary cell, the terminal apparatus 111 holds the timing value NTA, and thus it is possible to omit a random access procedure for correcting an uplink transmission timing again. Note that, after an instruction to change the primary cell or the secondary cell is received from the base station apparatus 101, the terminal apparatus 111 can initialize the timing value NTA related to a cell that is not used for communication, and stop TAT (Time alignment timer).

In a case where beamforming is applied, and it is determined that a control parameter for beamforming is not to be changed, it is possible to increase the speed of processing for switching between cells. In an example, the terminal apparatus 111 can hold information regarding activation/deactivation of TCI settings, TCI settings that are used for transmitting and receiving beams using channels such as PDSCH and PUSCH, information regarding beam control related to SRS-RI settings, and state variables, which were received from the base station apparatus 101 before an instruction to change the primary cell to a secondary cell is received, without initializing them. In this case, after the primary cell is changed to a secondary cell, the base station apparatus 101 does not need to select an optimum beam again based on a measurement result of a reference signal from the terminal apparatus 111, and notify the terminal apparatus 111 of information for beam control. For this reason, data can start to be transmitted/received between the base station apparatus 101 and the terminal apparatus 111 using appropriate transmission beam and receiving beam at an earlier stage.

In a case where it is determined that a HARQ control parameter is not to be changed, and, for example, an instruction to change a cell to a secondary cell is received before HARQ-ACK/NACK, which is a decoding result after PDSCH is received, is transmitted, the terminal apparatus 111 can transmit the HARQ-ACK/NACK after the cell has been changed to a secondary cell. Examples of the HARQ control parameter in this case can include a parameter nrofHARQ-ProcessesForPDSCH for setting the number of HARQ processes that are used for PDSCH, a parameter downlinkHARQ-FeedbackDisabled for disabling DL HARQ feedback, and a parameter harq-ProcessNumberSizeDCI-1-2 for setting the number of bits for the HARQ process number included in DCI format 1_2. Conventionally, in a case where the primary cell has been changed to a secondary cell, the terminal apparatus 111 cannot transmit HARQ-ACK/NACK using the secondary cell after the change, and thus the base station apparatus 101 retransmits PDSCH. In contrast, by the terminal apparatus 111 transmitting HARQ-ACK/NACK using the secondary cell after the change as described above, it is possible to suppress unnecessary retransmission of PDSCH, and increase the efficiency of communication. In addition, at this time, the terminal apparatus 111 may delay start of processing for changing the primary cell to a secondary cell until after HARQ-ACK/NACK has been transmitted. In addition, in a case where an instruction to change the primary cell to a secondary cell is received, and it is determined that a control parameter related to HARQ is not to be changed, the terminal apparatus 111 continues to hold data held in the HARQ soft buffer without erasing it. Accordingly, it is possible to combine data received before a cell change instruction and data received after the cell change instruction, decode the combined data, and thus further increase the efficiency of receiving processing.

In addition, if it is determined that a CDRX control parameter is not to be changed, the terminal apparatus 111 can continue timers related to CDRX control such as an onDurationTimer, an inactivityTimer, a drx-ShortCycleTimer, drx-HARQ-RTT-TimerDL, and drx-HARQ-RTT-TimerUL, without stopping them. Accordingly, it is possible to avoid a situation where the power supply of the terminal apparatus 111 is unnecessarily turned on upon a change of a cell to a secondary cell, and increase the efficiency of CDRX control. When the drx-ShortCycleTimer is running, the terminal apparatus 111 can transition to LongDRX more quickly by continuing the drx-ShortCycleTimer, in a case where PDCCH has not been transmitted from the base station apparatus 101. Accordingly, it is possible to further realize power saving of the terminal apparatus 111.

In addition, if it is determined that a PHR control parameter is not to be changed, the terminal apparatus 111 can continue timers related to PHR control such as a phr-PeriodicTimer and a phr-ProhibitTimer, without stopping them. When stopping the phr-PeriodicTimer, the terminal apparatus 111 starts the phr-PeriodicTimer at the time of the first uplink transmission after the primary cell has been changed to a secondary cell, thereby delaying a PHR transmission timing. In contrast, the terminal apparatus 111 can appropriately advance a PHR transmission timing by continuing the phr-PeriodicTimer, compared with a case where the phr-PeriodicTimer is stopped. As a result, it is possible to more precisely control the uplink transmission power of the terminal apparatus 111. In addition, when stopping the phr-ProhibitTimer, wasteful PHR transmissions can occur as a result of resetting a PHR transmission prohibition period once. In contrast, the terminal apparatus 111 can suppress the occurrence of such wasteful PHR transmission by continuing the phr-ProhibitTimer.

Note that the above describes detailed control related to beamforming control, HARQ control, CDRX control, and PHR control when the terminal apparatus 111 receives an instruction to change a cell that is being used as a primary cell to a secondary cell, but similar control can be performed also when an instruction to change a cell that is being used as a secondary cell to a primary cell is received. Accordingly, the terminal apparatus 111 can increase the efficiency of control related to scheduling request control, timing advance control, beamforming control, HARQ control, CDRX control, and PHR control.

In addition, when instructing the terminal apparatus 111 to start CA (carrier aggregation), the base station apparatus 101 performs notification of a control parameter for a cell that is added as a secondary cell, the parameter being used when communication is performed using the cell as a secondary cell, using layer 3 signaling such as RRC Reconfiguration. At this time, furthermore, the base station apparatus 101 may notify the terminal apparatus 111 of a control parameter that is used when communication is performed using the cell as a primary cell. That is to say, the base station apparatus 101 may notify, in advance, the terminal apparatus 111 of a control parameter that is to be used when the cell that is to be added as a secondary cell is changed to a primary cell and communication is then performed. Accordingly, when the terminal apparatus 111 changes the cell from a secondary cell to a primary cell, setting of necessary parameters from the base station apparatus 101 can be omitted. Accordingly, it is possible to reduce the message size of a change instruction that is transmitted from the base station apparatus 101 to the terminal apparatus 111. In addition, when the same control parameter is used in a case where a cell is used as a secondary cell and a case where the cell is used as a primary cell, a message that includes information indicating that a control parameter for one of the above cases is omitted and in which the control parameter is omitted is transmitted, and thus the message size can be reduced.

In addition, a control parameter that is to be used in a case where a cell that is added as a secondary cell is changed to a primary cell and communication is then performed is notified to the terminal apparatus 111 in advance, and thereby the base station apparatus 101 can give an instruction to change a cell that is being used as a secondary cell to a primary cell, using signaling of the layer 2 or the layer 1, not signaling of the layer 3. Accordingly, it is possible to execute processing for changing the secondary cell to a primary cell in the terminal apparatus 111 at a higher speed. In addition, it suffices for the change instruction to be given using either the primary cell or the secondary cell. When the primary cell is in a DRX mode or undergoing beam recovery, and it is thus difficult to transmit or receive a change instruction, for example, the base station apparatus 101 can reduce the delay in changing the secondary cell to a primary cell by transmitting a change instruction to the terminal apparatus 111 using the secondary cell. In addition, the terminal apparatus 111 can transmit a report on completion of processing for changing the secondary cell to a new primary cell, to the base station apparatus 101, using signaling of the layer 2 or layer 1 such as uplink MAC CE or UCI (uplink control information). Note that, for example, this report can be transmitted to the base station apparatus 101 using a cell that is newly used as a primary cell. In addition, the base station apparatus 101 may notify the terminal apparatus 111 of information indicating whether or not a cell that is to be changed from a primary cell continues to be used as a secondary cell in addition to the above change instruction. The terminal apparatus 111 may change the cell that will be no longer the primary cell, to a secondary cell, in accordance with an instruction from the base station apparatus 101, or may execute processing for making the cell unnecessary.

In addition, after a control parameter that is used when a cell that is being used as a secondary cell is changed to a primary cell and communication is then performed is set in the terminal apparatus 111, the base station apparatus 101 can request the terminal apparatus 111 to measure and report the radio quality of the primary cell and the secondary cell, and obtain measurement results. The base station apparatus 101 can give an instruction to change a cell that is being used as a secondary cell to a primary cell, based on the obtained measurement results. Note that whether measurement results are reported on a periodic-basis or event-basis, a cycle in the case where measurement results are reported on a periodic-basis, and an event type and a threshold value of an event in the case where measurement results are reported on an event-basis can be set using a layer 3 message when control parameters are set. In addition, in a case where settings for radio quality measurement have already been set in the terminal apparatus 111 before a control parameter that is used when communication is performed using a cell as a primary cell is set, the base station apparatus 101 may obtain measurement results based on the settings. Note that, as an example, the radio quality that is obtained by the base station apparatus 101 here can be CSI (channel state information)-RS (reference signal), RSSI (received signal strength indicator) of SS (synchronization signal), RSRP (reference signal received power), RSRQ (reference signal received quality), SNR (signal-to-noise ratio), SINR (signal-to-interference and noise ratio), or counter value BFI_COUNTER that is used for beam failure detection. In addition, start and end of radio quality measurement, which has been set using the above layer 3 message, may be instructed using signaling of the layer 1 or the layer 2. Accordingly, execution and non-execution of measurement for each cell are dynamically switched, and thus the efficiency of measurement can be increased. Here, for example, in a case where MeasConfig (measurement configuration) is configured by MeasObject (measurement object), ReportConfig (report configuration), and MeasId (measurement identifier), a measurement identifier indicating measurement settings according to which measurement needs to be started or stopped can be designated using layer 2 signaling such as downlink MAC CE or layer 1 signaling such as DCI.

In addition, when the secondary cell is changed to a primary cell, the terminal apparatus 111 may determine, regardless of an instruction from the base station apparatus 101, that the change needs to be performed, and request the base station apparatus 101 to perform the change. In this case, the base station apparatus 101 notifies, in advance, the terminal apparatus 111 of conditions and references for changing the cell that is being used as a secondary cell to a primary cell. At this time, the condition for the change provided to the terminal apparatus 111 can include, for example, the radio quality of the secondary cell being larger than or equal to a specific threshold, and the radio quality of the primary cell being smaller than or equal to the specific threshold. Note that the condition and reference can be set by the terminal apparatus 111 using layer 3 signaling, along with a control parameter that is used when communication is performed using this cell as a primary cell. If it is determined that the given condition is met, the terminal apparatus 111 requests the base station apparatus 101 to change the cell that is being used as the secondary cell to a primary cell. The base station apparatus 101 can then determine whether or not to fulfil the request from the terminal apparatus 111, and return a response that includes the determination result, to the terminal apparatus 111. At this time, the terminal apparatus 111 can transmit a request to change the cell to a primary cell, to the base station apparatus 101 using layer 2 signaling such as uplink MAC CE or layer 1 signaling such as UCI. The base station apparatus 101 can transmit a response to the request to the terminal apparatus 111 using layer 2 signaling such as downlink MAC CE or layer 1 signaling such as DCI.

The control parameter that is used when the terminal apparatus 111 performs communication using the primary cell includes (RLF) radio link failure control, lowMobilityEvaluation control, goodServingCellEvaluationRLM (power-saving control for radio link monitoring), random access control, and the like. Radio link failure control is control performed by the terminal apparatus 111 detecting an out-of-sync state during communication, and as necessary, performing processing for reconnection to the base station apparatus 101, the control parameters for the control include a timer value t310 for controlling a count period of the number of times of consecutive occurrence of out-of-sync state, n310 for designating the number of times of consecutive occurrence of out-of-sync state, and n311 for designating the number of times of consecutive occurrence of in-sync state. When an out-of-sync state occurs n310 times in a continuous manner, the terminal apparatus 111 starts t310, and after that, if t310 expires without n311 times of in-sync state being detected in a continuous manner, the terminal apparatus 111 determines that a radio link failure occurred, and starts reconnection processing. Low mobility evaluation control is control performed by the terminal apparatus 111 determining whether or not the terminal apparatus 111 is in a low-mobility state, and, if it is determined that the terminal apparatus 111 is in a low-mobility state, the measurement frequency of the radio quality measurement of a serving cell is reduced to realize power saving. Control parameters for low mobility evaluation control includes s-SearchDeltaP-Connected and t-SearchDeltaP-Connected. The terminal apparatus 111 determines whether or not the terminal apparatus 111 is in a low-mobility state by determining whether or not the fluctuation range of measured radio quality is within s-SearchDeltaP-Connected for a certain period indicated by t-SearchDeltaP-Connected. Power-saving control for radio link monitoring is control for extending the cycle of radio link monitoring, reducing the measurement frequency, and suppressing the power consumption, if the radio quality of the serving cell is favorable. Control parameters for power-saving control for radio link monitoring include criteria for performing the same function and information for designating a condition. In a case where communication is performed through CA (carrier aggregation), uplink transmission is performed only in the primary cell. For this reason, random access control is control unique to a primary cell, and the control parameter for random access control can be included in the control parameters that are used when communication is performed using a cell as a primary cell.

In addition, a timer that is used when a cell is switched to a primary cell (for example, t304) can also be included in the control parameters that are used when communication is performed using a cell as a primary cell. The terminal apparatus 111 starts the timer t304 at a timing when an instruction to switch the cell to a primary cell is given using signaling of the layer 2 or the layer 1, and stops t304 upon successful completion of random access after that. In addition, if t304 has expired without successful random access, the terminal apparatus 111 can determine that a switch of the cell to a primary cell has failed, and start reconnection processing. In addition, in a case where random access is not performed, the terminal apparatus 111 may stop t304 in accordance with completion of transmission of a response signal to the base station apparatus 101 in response to an instruction to switch the cell to a primary cell.

In addition, RNTI (Radio Network Temporary Identifier) that is used when the secondary cell is changed to a primary cell can also be included in the control parameters that are used when communication is performed using a cell as a primary cell. RNTI is an identifier provided for the base station apparatus 101 to distinguish between a plurality of terminal apparatuses connected thereto. The terminal apparatus 111 determines whether or not a received signal is for the terminal apparatus 111 itself by comparing RNTI included in the received signal with RNTI of the terminal apparatus 111 itself. RNTI may be notified from the base station apparatus 101 to the terminal apparatus 111 using layer 3 signaling at the time of setting of control parameters before the cell is changed to a primary cell, or may be notified from the base station apparatus 101 to the terminal apparatus 111 using signaling of the layer 2 or the layer 1 at the time of a change of the cell to a primary cell.

In addition, the terminal apparatus 111 to which the base station apparatus 101 is connected (with which the base station apparatus 101 is performing communication) can be notified of control parameters that are used when communication is performed using a cell that is not being used for communication as a secondary cell and control parameters that are used when communication is performed using the cell as a primary cell, by the base station apparatus 101, for example, using layer 3 signaling such as RRC Reconfiguration. Note that a configuration may also be adopted in which only control parameters that are used when communication is performed using the cell as a secondary cell or only control parameters that are used when communication is performed using the cell as a primary cell are notified to the terminal apparatus 111. In this case, the base station apparatus 101 can transmit an instruction to change the primary cell to the cell or an instruction to change the secondary cell to the cell, to the terminal apparatus 111 using layer 2 or layer 1 signaling, based on a radio quality measurement result notified from the terminal apparatus 111, after notification of the control parameters. In addition, also in this case, the terminal apparatus 111 may determine that a change of the primary cell is to be requested, regardless of an instruction from the base station apparatus 101, and transmit a request signal to the base station apparatus 101. At this time, the base station apparatus 101 can notify, in advance, the terminal apparatus 111 of a condition and a reference for when the cell is used as a primary cell or a secondary cell. The condition and reference are notified from the base station apparatus 101 to the terminal apparatus 111 using layer 3 signaling, along with control parameters that are to be used when the terminal apparatus 111 performs communication using the cell as a primary cell or a secondary cell. When the given condition is met, the terminal apparatus 111 transmits a request message to the base station apparatus 101 in order to use the cell as a primary cell or a secondary cell. The base station apparatus 101 can then determine whether or not to fulfill the request from the terminal apparatus 111, and return a response that includes the determination result to the terminal apparatus 111. At this time, the terminal apparatus 111 can transmit a request to change the cell to a primary cell to the base station apparatus 101 using layer 2 signaling such as uplink MAC CE or layer 1 signaling such as UCI. In addition, the base station apparatus 101 can transmit a response to the change request to the terminal apparatus 111 using layer 2 signaling such as downlink MAC CE or layer 1 signaling such as DCI. In addition, notification of control parameters that are used when communication is performed using a cell that is not being used for communication as a secondary cell, and control parameters that are used when communication is performed using the cell as a primary cell may be included in the layer 3 message instructing that communicate is started. In this case, along with the control parameters that are used when communication is performed using one or more cells as secondary cells and control parameters that are used when communication is performed using one or more cells as primary cells, information for identifying a primary cell and a secondary cell that are used for communication when communicate is started and a cell that is not used for communication can be included. In addition, at this time, in a case where radio measurement setting is instructed at the same time, information for identifying measurement setting for setting a measurement object and measurement setting for setting a non-measurement object at the time of start of communication may be included. In addition, when notification of control parameters of a plurality of cells is performed, notification of control parameters of several cells is performed as a difference in setting value from a control parameter of another cell, and thus it is possible to reduce the data size of the control parameters.

In addition, the terminal apparatus 111 erases control parameters that are to be used when a cell is used as a primary cell or a secondary cell, in accordance with an instruction from the base station apparatus 101. The base station apparatus 101 can transmit an instruction to erase control parameters to the terminal apparatus 111 using layer 3, layer 2, or layer 1 signaling. In addition, when setting control parameters, the base station apparatus 101 may further notify the terminal apparatus 111 of a condition under which the control parameters are to be erased. The terminal apparatus 111 can erase control parameters not only when an instruction from the base station apparatus 101 is received or a notified condition is met, but also when, for example, communication is ended to transition to a standby state.

In addition, in accordance with the terminal apparatus 111 establishing connection with one base station apparatus that provides a communication service in a predetermined area (due to initial connection or handover to the base station apparatus, or by adding a cell that is provided by the base station apparatus as a secondary cell), the base station apparatus can notify the terminal apparatus 111 of information regarding control parameters. The base station apparatus to which the terminal apparatus 111 has been connected can notify the terminal apparatus 111 of preset information that includes a condition that is to be met by the terminal apparatus 111 when a plurality of base station apparatuses that belong to the predetermined area are used as primary cells or secondary cells, and setting of control parameters that are to be used when communication is performed using (the plurality of base station apparatuses) as primary cells or secondary cells. The base station apparatus to which the terminal apparatus 111 is connected then shares the preset information notified to the terminal apparatus 111, with another base station apparatus in the predetermined area. Note that the base station apparatus connected to the terminal apparatus 111 can also perform presetting for a case where a handover from another base station apparatus to the base station apparatus is performed, and share the preset information with the other base station apparatus in the predetermined area. The base station apparatus in the predetermined area can then erase the preset information in accordance with the terminal apparatus 111 performing a handover to the outside of the predetermined area. Based on this, after establishing connection within the predetermined area, the terminal apparatus 111 can continuously execute a conditional handover in the predetermined area. Note that the predetermined area can be, for example, an area corresponding to the same TAI (tracking area identifier), the same TAC (tracking area code), or the same system information area identifier (systemInformationAreaID), but another area (for example, an area unique to the terminal apparatus 111) may be defined. In addition, the predetermined area may also be an area corresponding to RAN-based Notification Area that is used when position information of the terminal apparatus 111 is recorded/managed by the base station apparatus while the terminal apparatus 111 is operating in an RRC_INACTIVE state. In addition, the predetermined area may also be an area configured by some or all of the cells held in the same aggregation node (CU: central unit).

The base station apparatus 101 determines whether or not to change the secondary cell to a primary cell and whether or not to change the primary cell to a secondary cell in consideration of capability information (UE capability) that includes information regarding a combination of frequency bands that can be used when the terminal apparatus 111 executes carrier aggregation, the information being presented by the terminal apparatus 111.

Assume that, for example, the capability information of the terminal apparatus 111 indicates that uplink transmission can be performed using only the band 1 in carrier aggregation of the band 1 and the band 41. In this case, when the primary cell is a cell that is using the band 1 and the secondary cell is a cell that is using the band 41, the base station apparatus 101 cannot change the cell that is using the band 41 that does not enable the terminal apparatus 111 to perform uplink transmission, to a primary cell, nor change the cell that is using the band 1 to a secondary cell. That is to say, in such a case, the base station apparatus 101 does not instruct the terminal apparatus 111 to switch between the primary cell and the secondary cell and continue carrier aggregation. In this case, as an example, the base station apparatus 101 can instruct the terminal apparatus 111 to change the cell that is using the band 41 to a primary cell, and make a cell, which has been used as a primary cell and is using the band 1, unnecessary instead of using the cell as a secondary cell. In addition, upon receiving an instruction to change the cell that is using the band 41 to a primary cell, and change the cell that is using the band 1 to a secondary cell from the base station apparatus 101, the terminal apparatus 111 may change the cell that is using the band 41 to a primary cell, and notify the base station apparatus 101 that the band 1 is not to be used. In this case, the terminal apparatus 111 may discard the change instruction from the base station apparatus 101, and start reconnection processing in order to resolve any inconsistencies between the terminal apparatus 111 and the base station apparatus 101.

In addition, for example, assume that capability information from the terminal apparatus 111 indicates that carrier aggregation of the band 1 and the band 18 is possible, and, at this time, uplink transmission is possible for both the band 1 and the band 18. Here, when the terminal apparatus 111 is executing carrier aggregation in which the primary cell is using the band 1 and the secondary cell is using the band 18, the base station apparatus 101 may instruct the terminal apparatus 111 to change the primary cell to a cell of the band 18 and change the secondary cell to a cell of the band 1. In addition, at this time, the base station apparatus 101 may instruct the terminal apparatus 111 to change the primary cell to a cell of the band 18 and not to use the cell of the band 1 as a secondary cell.

Note that, also in determination on whether or not to change a cell that is not being used for communication to a primary cell or a secondary cell, similarly to the above example, capability information (UE capability) of the terminal apparatus 111 can be taken into consideration. While the terminal apparatus 111 is executing carrier aggregation using the band 1 and the band 18, for example, the primary cell is changed to a cell of the band 41. Here, if the capability information of the terminal apparatus 111 indicates that both carrier aggregation of a combination of the band 1 and the band 41 and carrier aggregation of a combination of the band 18 and the band 41 are impossible, the base station apparatus 101 can instruct the terminal apparatus 111 not to continue to use the cells of the band 1 and the band 18. In this case, if the capability information of the terminal apparatus 111 indicates that both carrier aggregation of the combination of the band 1 and the band 41 and carrier aggregation of the combination of the band 18 and the band 41 are possible, the base station apparatus 101 can instruct the terminal apparatus 111 to or not to continue to use the cell of the band 1 or the band 18 as a secondary cell. In addition, when determination is independently performed on a change of the primary cell to a cell of the band 41, for example, the terminal apparatus 111 can determine whether or not it is possible to continue to use the cell of the band 1 and the cell of the band 18, based on the capability information of the terminal apparatus 111 itself. Note that, even if the terminal apparatus 111 has the capability of continuing to use the cells of the band 1 and the band 18, when the cell of the band 41 is set as a primary cell, for example, from a viewpoint of power saving and the like, the terminal apparatus 111 may determine that only one of the cell of the band 1 and the cell of the band 18 is to be used or that both are not to be used. The terminal apparatus 111 can then transmit a request signal that is based on the result of the determination, to the base station apparatus 101. In addition, the terminal apparatus 111 can notify the base station apparatus 101 of capability information (UE capability) that includes information regarding whether or not control parameters that are to be used when a cell that is not being used for communication is used as a primary cell or a secondary cell can be set in advance before the parameters are used. Similarly, the terminal apparatus 111 may notify the base station apparatus 101 of capability information that includes information regarding whether or not control parameters that are to be used when a cell that is being used as a secondary cell is used as a primary cell can be set in advance before the control parameters are used for communication, and information regarding whether or not control parameters that are to be used when a cell that is being used as a primary cell is used as a secondary cell can be set in advance before the control parameters are used for communication. In these cases, the base station apparatus 101 can instruct only the terminal apparatus that has performed notification of capability information indicating that presetting can be performed, to perform presetting.

In addition, in the above example, a case has been described in which the secondary cell and the primary cell are switched in CA (carrier aggregation), but there is no limitation thereto. In a case where the terminal apparatus 111 and the base station apparatus 101 communicate with each other using TRP or TRxP (transmission and reception point) that includes different PCIs (physical cell identifiers) in Inter cell beam management, for example, the above technique can be applied also when a primary TRP and an additional TRP are switched. That is to say, using a method similar to the above method, it is possible to increase the efficiency of and achieve improvement of control related to scheduling request control, timing advance control, beamforming control, HARQ control, CDRX control, and PHR control.

In addition, also when a primary TRP and an additional TRP are switched in Inter cell beam management), control parameters (for example, control information Common Search Space for receiving PDCCH related to notification information and paging) required when at least one PCI that is used as an additional TRP is used as a primary TRP can be notified to the terminal apparatus 111 using layer 3 signaling or the like in advance. The base station apparatus 101 then instructs the terminal apparatus 111 to switch between the primary TRP and the additional TRP, using layer 2 or layer 1 signaling, based on the radio quality measurement result from the terminal apparatus 111. Note that the terminal apparatus 111 may determine that the primary TRP and the additional TRP are to be switched, regardless of an instruction from the base station apparatus 101, and transmit, to the base station apparatus 101, a request signal requesting a switch between the TRPs that is based on the determination result. In addition, when a control parameter required when at least one PCI is used as a primary TRP is the same as a control parameter that is used when TRP (or TRxP) that includes another PCI is used as a primary TRP, the base station apparatus 101 may notify the terminal apparatus 111 that notification of the control parameter is omitted. In addition, the base station apparatus 101 may perform notification of only a change difference from a control parameter that is used when TRP (or TRxP) that includes another PCI is used as a primary TRP, as a control parameter required when TRP (or TRxP) is used as a primary TRP.

Configuration of Apparatus

An exemplary hardware configuration of a base station apparatus and a terminal apparatus will be described with reference to FIG. 2. In an example, the base station apparatus and the terminal apparatus are each configured by including a processor 201, a ROM 202, a RAM 203, a storage device 204, and a communication circuit 205. The processor 201 is a computer configured including a general-purpose CPU (central processing unit) and one or more processing circuits such as an ASIC (application-specific integrated circuit), and executes overall processing of the apparatus and above processing by reading out and executing a program stored in the ROM 202 or the storage device 204. The ROM 202 is a read-only memory that stores information such as programs and various parameters related to processing that is executed by the base station apparatus and the terminal apparatus. The RAM 203 is a random access memory that functions as a workspace when the processor 201 executes a program, and also stores temporary information. The storage device 204 is constituted by a detachable external storage device or the like. The communication circuit 205 is constituted by a circuit for wireless communication of 5G and post-5G standards, for example. Note that FIG. 2 illustrates one communication circuit 205, but, for example, the base station apparatus and the terminal apparatus may each include two or more communication circuits. In addition, for example, the base station apparatus and the terminal apparatus can each include wireless communication circuits for 5G and post-5G standards and a common antenna. Note that the base station apparatus and the terminal apparatus may each include an antenna for the 5G standard and an antenna for the post-5G standard, separately. In addition, the terminal apparatus may include a communication circuit for another wireless communication network such as a wireless LAN. Note that the base station apparatus and the terminal apparatus may each include separate communication circuits for respective available frequency bands, or may include a communication circuit common to at least some of the frequency bands. Note that, in the present embodiment, the terminal apparatus includes a plurality of communication circuits that can communicate using a common frequency band. In addition, the base station apparatus can further include a wired communication circuit that is used when communication is performed with another base station apparatus or a node in a core network.

FIG. 3 is a diagram showing an exemplary functional configuration of the base station apparatus. The base station apparatus includes, as functions thereof, a control parameter setting unit 301, a primary cell change determination unit 302, a primary cell change instruction notification unit 303, and a layer 2/layer 1 control unit 304, for example. Note that FIG. 3 only shows functions particularly related to the present embodiment, and illustration of other various functions that the base station apparatus can have is omitted. As a matter of course, the base station apparatus has other functions that a base station apparatus that complies with 5G and post-5G standards has in general, for example. In addition, the functional blocks in FIG. 3 are schematically shown, and the functional blocks may be realized in an integrated manner, or may be further subdivided. In addition, the functions in FIG. 3 may be realized by the processor 201 executing a program stored in the ROM 202 or the storage device 204, for example, or may be realized by a processor included in the communication circuit 205 executing predetermined software, for example. Note that processing that is executed by each function unit is not described here in detail with respect to the above detailed description, and only functions thereof will be described schematically.

When instructing the terminal apparatus 111 to start CA (carrier aggregation), the control parameter setting unit 301 performs notification of control parameters that are used when communication is performed using, as a secondary cell, a cell that is added as a secondary cell. Furthermore, the control parameter setting unit 301 also notifies the terminal apparatus 111 of control parameters that are used when communication is performed using the cell as a primary cell. The control parameter setting unit 301 can transmit control parameters such as those described above to the terminal apparatus 111 using layer 3 signaling such as RRC Reconfiguration, for example. The primary cell change determination unit 302 requests the terminal apparatus 111 to measure and report the radio quality of the primary cell and the secondary cell, and obtains measurement results of the radio quality from the terminal apparatus 111. The primary cell change determination unit 302 determines that a cell that is being used as a secondary cell is to be changed to a primary cell, for example, based on the measurement results obtained from the terminal apparatus 111. The primary cell change instruction notification unit 303 instructs the terminal apparatus 111 to change a cell that is being used as a secondary cell to a primary cell, based on a determination result of the primary cell change determination unit 302. Note that the primary cell change instruction notification unit 303 transmits an instruction to the terminal apparatus 111 using layer 2 or layer 1 signaling, for example.

The layer 2/layer 1 control unit 304 determines whether or not control parameters for the layer 2 and the layer 1 are to be changed due to a change of the primary cell, and determines whether or not there is a need to initialize state variables used to control the layer 2/layer 1 before the change of the primary cell, and whether or not there is a need to continue processing that was started before the change. If it is determined that a control parameter related to beam control is not to be changed, for example, the layer 2/layer 1 control unit 304 selects a suitable beam after the change of the primary cell, based on a measurement result of a beam received from the terminal apparatus 111 before the change of the primary cell. In addition, in this case, the layer 2/layer 1 control unit 304 may perform beam control by selecting an appropriate TCI setting from activated TCI settings based on information regarding activation/deactivation of TCI settings that had been set in the terminal apparatus 111 before the change of primary cell. In addition, for example, in HARQ control, if it is determined that a control parameter is not to be changed after the change of the primary cell, the layer 2/layer 1 control unit 304 can perform control so as to receive, after the change of primary cell, HARQ-ACK/NACK in response to data transmitted to the terminal apparatus 111 before the change of primary cell.

Figure 4:
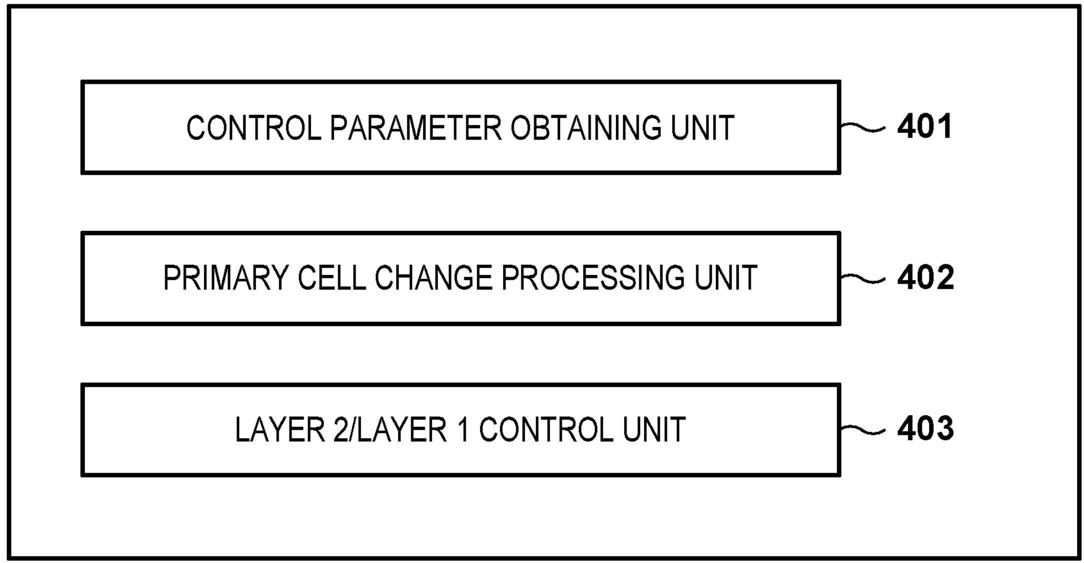
FIG. 4 is a diagram showing an exemplary functional configuration of a terminal apparatus.

FIG. 4 is a diagram showing an exemplary functional configuration of the terminal apparatus. The terminal apparatus includes, as functions thereof, a control parameter obtaining unit 401, a primary cell change processing unit 402, and a layer 2/layer 1 control unit 403, for example. Note that FIG. 4 only shows functions particularly related to the present embodiment, and illustration of other various functions that the terminal apparatus can have is omitted. As a matter of course, the terminal apparatus has other functions that a terminal apparatus that complies with 5G and post-5G standards has in general, for example. In addition, the functional blocks in FIG. 4 are schematically shown, and the functional blocks may be realized in an integrated manner, or may be further subdivided. In addition, the functions in FIG. 4 may be realized by the processor 201 executing a program stored in the ROM 202 or the storage device 204, for example, or may be realized by a processor included in the communication circuit 205 executing predetermined software, for example. Note that processing that is executed by each function unit is not described here in detail with respect to the above detailed description, and only functions thereof will be described schematically.

The control parameter obtaining unit 401 obtains, from a base station apparatus connected thereto, control parameters for a case where each cell is used as a primary cell and control parameters for a case where each cell is used as a secondary cell. The control parameter obtaining unit 401 executes processing for performing setting in the terminal apparatus based on the obtained control parameters. The control parameter obtaining unit 401 receives a setting message (RRC message such as RRC Reconfigurationmessage), for example, and thereby obtains control parameters included in the setting message. The primary cell change processing unit 402 performs processing for changing a cell that is currently being used as a secondary cell to a primary cell. The primary cell change processing unit 402 receives an instruction to change the cell to a primary cell from the base station apparatus 101, using layer 2 signaling such as downlink MAC CE or layer 1 signaling such as DCI, for example.

The layer 2/layer 1 control unit 403 determines whether or not control parameters for the layer 2 and the layer 1 are to be changed due to a change of the primary cell, and determines whether or not there is a need to initialize state variables used to control the layer 2/layer 1 before the change of the primary cell, and whether or not there is a need to continue processing that was started before the change. If it is determined that a HARQ control parameter is not to be changed, for example, the layer 2/layer 1 control unit 403 performs control so as to hold data held in the HARQ soft buffer without erasing it. In addition, if it is determined that a CDRX control parameter is not to be changed, the layer 2/layer 1 control unit 403 performs control so as to continue timers related to CDRX control such as an onDurationTimer, an inactivityTimer, a drx-ShortCycleTimer, drx-HARQ-RTT-TimerDL, and drx-HARQ-RTT-TimerUL without stopping them.

Flow of Processing

Next, an example of flow of processing that is executed in the wireless communication system will be described with reference to FIG. 5. Note that detailed processing described here is the same as that described above, and thus, here, the processing will be only schematically described, and a detailed description thereof is omitted.

In FIG. 5, initial connection has been established between the terminal apparatus 111 and the base station apparatus 101. In this state, for example, upon instructing the terminal apparatus 111 to add a secondary cell, the base station apparatus 101 sets control parameters related to the cell as communication setting of the terminal apparatus 111 (step S501). Note that the terminal apparatus 111 is using, as a primary cell, one cell out of one or more cells provided by the base station apparatus 101 to which initial connection has been established. In order to add a secondary cell, the base station apparatus 101 notifies the terminal apparatus 111 of control parameters for performing communication using a cell as a secondary cell. Based on this setting, the base station apparatus 101 executes setting processing for adding a secondary cell, based on the notified control parameters. In addition to this, the base station apparatus 101 also notifies the terminal apparatus 111 of control parameters that are to be used when the terminal apparatus 111 performs communication using the cell as a primary cell. After a secondary cell is added, the terminal apparatus 111 performs radio quality measurement of the primary cell and the secondary cell, and reports the measurement values to the base station apparatus 101 (step S502). Here, assume that the base station apparatus 101 determines that, based on the received measurement results, the cell that is being used as a secondary cell is to be changed to a primary cell. In this case, based on the determination result, the base station apparatus 101 instructs the terminal apparatus 111 to change the cell that is being used as a secondary cell to a primary cell (step S503). Upon receiving the instruction, the terminal apparatus 111 determines whether or not control parameters for the layer 2 and the layer 1 are to be changed due to the change to the primary cell, determines whether or not there is a need to initialize state variable that had been used for layer 2/layer 1 control before the change to the primary cell (step S504), and determines whether or not there is a need to continue processing that had been started before the change (step S505). If it is determined that a HARQ control parameter is not to be changed, for example, the terminal apparatus 111 determines that data held in the HARQ soft buffer continues to be held without being erased. In addition, if it is determined that CDRX and PHR control parameters are not to be changed, the terminal apparatus 111 determines that a timer related to CDRX control such as onDurationTimer and a timer related to PHR control such as phr-PeriodicTimer are to be continued, without being stopped. In addition, in another example, if it is determined that a control parameter related to beam control is not to be changed, the terminal apparatus 111 can determine that information regarding activation/deactivation of TCI settings that had been set before the change to the primary cell continues to be held without being erased. The terminal apparatus 111 then transmits a response to the instruction to change to the primary cell, to the base station apparatus 101 (step S506).

According to the present invention, it is possible for a terminal apparatus that is connected to a plurality of cells in parallel to perform a switch between connection-target cells at a high speed.

As described above, according to the present embodiment, in DC and CA, it is possible to execute a switch between a primary cell and a secondary cell at a higher speed. Thus, it is possible to contribute to the United Nations-led SDG (Sustainable Development Goal) 9: "Build resilient infrastructure, promote inclusive and sustainable industrialization, and foster innovation".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus that communicates with a base station apparatus using a primary cell and a secondary cell through carrier aggregation, the terminal apparatus comprising:

one or more processors; and one or more memories that store a computer-readable instruction for causing, when executed by the one or more processors, the one or more processors to execute operations including:

receiving both of parameters required when one or more cells are used as primary cells, respectively, and parameters required when the one or more cells are used as secondary cells, respectively;

changing a first cell among the one or more cells to a primary cell in a case where the first cell is being used as a secondary cell; and receiving, from the base station apparatus, information regarding whether or not to continue to use, as a secondary cell, a second cell that will be no longer a primary cell after the first cell is changed to a primary cell, wherein, when changing the first cell to a primary cell, the terminal apparatus executes random access control on the primary cell, wherein the operations further include performing determination of whether the random access control was successful or failed, wherein in the determination of whether the random access control was successful or failed:

a timer is started at a timing when the terminal apparatus instructs a change, a timer is stopped upon success of random access control, and it is determined whether or not a started timer expires, and wherein the operations further includes determining that a switch of a primary cell was successful or failed, based on a result of successful or failed random access control.

2. The terminal apparatus according to claim 1, wherein the operations further include when an instruction to continue to use the second cell as a secondary cell is received, determining whether or not a CDRX (connected discontinuous reception) control parameter of the second cell is the same parameter in a case where the second cell is used as a primary cell and in a case where the second cell is used as a secondary cell; and continuing a timer related to CDRX control that is running, without stopping the timer, in a case where it is determined that the CDRX control parameter is the same and the second cell is changed to a secondary cell.

3. The terminal apparatus according to claim 1, wherein the operations further include determining whether or not a parameter related to beam control of the second cell is the same parameter in a case where the second cell is used as a primary cell and a case where the second cell is used as a secondary cell, when an instruction to continue to use the second cell as a secondary cell is received; and continuing beam recovery processing instead of stopping the beam recovery processing upon a change of the second cell to a secondary cell, in a case where it is determined that the parameter related to beam control is the same, and the beam recovery processing had been started when the second cell was being used as a primary cell.

4. The terminal apparatus according to claim 1, wherein the operations further include determining whether or not HARQ-related setting for the first cell is the same in a case where the first cell is used as a primary cell and a case where the first cell is used as a secondary cell; and holding data held in a HARQ soft buffer of the terminal apparatus instead of erasing the data, if it is determined that the HARQ (hybrid automatic repeat request)-related setting is the same.

5. The terminal apparatus according to claim 1, wherein wherein the terminal apparatus receives a parameter using an RRC Reconfiguration message, and when changing the first cell to a primary cell, the terminal apparatus obtains a value of an RNTI (a radio network temporary identifier) that is used after a change of the first cell to a primary cell, from the base station apparatus using MAC CE (media access control/control element) or DCI (downlink control information).

6. The terminal apparatus according to claim 1, wherein the terminal apparatus receives, as parameters required when the one or more cells are used as primary cells, an RRC Reconfiguration message that includes a value of RNTI (radio network temporary identifier) that is used after the one or more cells are set as primary cells and the primary cells are changed, the terminal apparatus changes the first cell to a primary cell in accordance with receiving an instruction given from the base station apparatus using MAC CE (media access control/control element) or DCI (downlink control information), and a value of RNTI received by the terminal apparatus is used with respect to the first cell after the first cell has changed to a primary cell.

7. The terminal apparatus according to claim 1, wherein if it is determined that a timer has expired without random access control being successful, the terminal apparatus determines that a switch to a primary cell failed.

8. The terminal apparatus according to claim 7, wherein the operations further include starting reconnection processing in accordance with determining that a switch to a primary cell failed.

9. A control method performed by a terminal apparatus that communicates with a base station apparatus using a primary cell and a secondary cell through carrier aggregation, the method comprising:

receiving both of parameters required when one or more cells are used as primary cells, respectively, and parameters required when the one or more cells are used as secondary cells, respectively;

changing a first cell among the one or more cells to a primary cell in a case where the first cell is being used as a secondary cell; and receiving, from the base station apparatus, information regarding whether or not to continue to use, as a secondary cell, a second cell that will be no longer a primary cell after the first cell is changed to a primary cell, wherein, when changing the first cell to a primary cell, the terminal apparatus executes random access control on the primary cell, wherein the operations further include performing determination of whether the random access control was successful or failed, wherein in the determination of whether the random access control was successful or failed:

a timer is started at a timing when the terminal apparatus instructs a change, a timer is stopped upon success of random access control, and it is determined whether or not a started timer expires, and wherein the operations further includes determining that a switch of a primary cell was successful or failed, based on a result of successful or failed random access control.

* * * * *